United States Patent
Ueyama et al.

(10) Patent No.: US 9,511,310 B2
(45) Date of Patent: Dec. 6, 2016

(54) DEVICE AND METHOD FOR TREATING BALLAST WATER FOR SHIP

(75) Inventors: Munetsugu Ueyama, Osaka (JP); Ryusuke Nakai, Osaka (JP); Hideki Kashihara, Osaka (JP); Manabu Okui, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 1072 days.

(21) Appl. No.: 13/580,175

(22) PCT Filed: Feb. 16, 2011

(86) PCT No.: PCT/JP2011/053227
§ 371 (c)(1),
(2), (4) Date: Aug. 21, 2012

(87) PCT Pub. No.: WO2011/105260
PCT Pub. Date: Sep. 1, 2011

(65) Prior Publication Data
US 2012/0312757 A1    Dec. 13, 2012

(30) Foreign Application Priority Data

Feb. 25, 2010 (JP) ................................ 2010-040317
Nov. 30, 2010 (JP) ................................ 2010-265877

(51) Int. Cl.
*B01D 33/70* (2006.01)
*B01D 37/00* (2006.01)
(Continued)

(52) U.S. Cl.
CPC ........... *B01D 29/21* (2013.01); *B01D 29/6446* (2013.01); *B01D 29/74* (2013.01); *B01D 29/92* (2013.01);
(Continued)

(58) Field of Classification Search
CPC ............ B01D 29/0022; B01D 29/0075; B01D 29/0077; B01D 29/0079; B01D 29/0081; B01D 29/0084; B01D 29/0016; B01D 29/0031; B01D 29/07; B01D 29/0073;
(Continued)

(56) References Cited

U.S. PATENT DOCUMENTS 2,099,502 A    11/1937    Stockdale
3,647,071 A *   3/1972    Lamort ............. B01D 33/0051
                                                        210/107

(Continued)

FOREIGN PATENT DOCUMENTS

CN    2408945 Y    12/2000
CN    101485944 A    7/2009
(Continued)

OTHER PUBLICATIONS

U.S. Appl. No. 14/000,456, filed Aug. 20, 2013, Ozawa et al.
(Continued)

*Primary Examiner* — David C Mellon
*Assistant Examiner* — Pranav Patel
(74) *Attorney, Agent, or Firm* — Drinker Biddle & Reath LLP (57) ABSTRACT

A filter disposed as a cylinder around an axis line, and provided to be rotatable around the axis line, a treated water nozzle for emitting treated water toward an outer circumferential surface of the filter, a case provided to surround the filter, and including an outer cylindrical portion having a nozzle opening of the treated water nozzle therein, a filtered water flow path for guiding filtered water that has been transmitted through the filter to outside of the case from within the cylinder of the filter, and a discharge flow path for discharging discharged water that was not filtered through the filter to the outside of the case are provided.

13 Claims, 11 Drawing Sheets

(51) Int. Cl.
| | |
|---|---|
| B01D 29/21 | (2006.01) |
| B01D 29/64 | (2006.01) |
| B01D 29/74 | (2006.01) |
| B01D 29/92 | (2006.01) |
| C02F 1/32 | (2006.01) |
| B01D 33/073 | (2006.01) |
| B01D 33/39 | (2006.01) |
| B01D 33/46 | (2006.01) |
| B01D 35/30 | (2006.01) |
| B63J 4/00 | (2006.01) |
| C02F 1/00 | (2006.01) |
| C02F 103/00 | (2006.01) |

(52) U.S. Cl.
CPC ............ *B01D 33/073* (2013.01); *B01D 33/39* (2013.01); *B01D 33/463* (2013.01); *B01D 35/303* (2013.01); *C02F 1/325* (2013.01); *B01D 2201/583* (2013.01); *B63J 4/002* (2013.01); *C02F 1/001* (2013.01); *C02F 2103/008* (2013.01); *C02F 2209/11* (2013.01); *C02F 2303/04* (2013.01); *Y02T 70/36* (2013.01)

(58) Field of Classification Search
CPC ....... B01D 29/114; B01D 29/15; B01D 29/21; B01D 29/216; B01D 29/33; B01D 29/333; B01D 29/62; B01D 29/6438; B01D 29/6446; B01D 29/6461; B01D 29/66; B01D 29/68; B01D 29/682; B01D 29/686; B01D 29/688; B01D 33/0006; B01D 33/0009; B01D 33/0061; B01D 33/0064; B01D 33/0067; B01D 33/0077; B01D 33/0083; B01D 33/06; B01D 33/073; B01D 33/44; B01D 33/46; B01D 33/4631; B01D 33/50; B01D 33/503; B01D 65/02; B01D 2201/08; B01D 2201/081; B01D 2201/084; B01D 2201/086; B01D 2201/12
USPC .......................................... 239/592, 597, 601
See application file for complete search history.

(56) References Cited

U.S. PATENT DOCUMENTS

| | | | |
|---|---|---|---|
| 4,108,778 A | 8/1978 | Lambert et al. | |
| 4,462,902 A | 7/1984 | Silhouette | |
| 4,905,911 A | 3/1990 | Sakuma | |
| 5,110,463 A | 5/1992 | Yuichi et al. | |
| 5,143,529 A * | 9/1992 | Means, Jr. .............. | B08B 5/02 134/22.12 |
| 5,470,472 A | 11/1995 | Baird et al. | |
| 5,743,468 A | 4/1998 | Laidler | |
| 5,989,419 A | 11/1999 | Dudley et al. | |
| 2003/0127388 A1* | 7/2003 | Ando ..................... | B01D 61/04 210/636 |
| 2004/0200770 A1* | 10/2004 | Clary .................... | B01D 29/21 210/391 |
| 2007/0034562 A1* | 2/2007 | Vernocchi ................ | B08B 3/02 210/321.69 |
| 2010/0101998 A1 | 4/2010 | Saito et al. | |
| 2010/0163480 A1* | 7/2010 | Pracher ................. | B01D 29/15 210/411 |
| 2012/0312757 A1 | 12/2012 | Ueyama et al. | |
| 2015/0336651 A1 | 11/2015 | Harada et al. | |

FOREIGN PATENT DOCUMENTS

| | | |
|---|---|---|
| CN | 202161863 U | 3/2012 |
| EP | 0 078 727 A1 | 5/1983 |
| EP | WO2009016062 * | 2/2009 |
| JP | 56-37017 | 4/1981 |
| JP | 61-21713 A | 1/1986 |
| JP | 62-042732 Y2 | 11/1987 |
| JP | 1-307416 | 12/1989 |
| JP | 2000-167317 | 6/2000 |
| JP | 2000-288316 | 10/2000 |
| JP | 2002-113498 | 4/2002 |
| JP | 2004-330009 | 11/2004 |
| JP | 2005-88835 A | 4/2005 |
| JP | 3660984 | 6/2005 |
| JP | 2006-728 | 1/2006 |
| JP | 2007-130563 | 5/2007 |
| JP | 2007-160242 A | 6/2007 |
| JP | 2008-093783 | 4/2008 |
| JP | 2008-212852 | 9/2008 |
| JP | 4261955 | 5/2009 |
| JP | 2011-5456 | 1/2011 |
| JP | 2011-189237 A | 9/2011 |
| JP | 2011-194396 A | 10/2011 |
| JP | 2011-255365 A | 12/2011 |
| JP | 4835785 B2 | 12/2011 |
| JP | 2014-034002 A | 2/2014 |
| WO | WO 96/34674 A1 | 11/1996 |
| WO | WO 02/076573 A1 | 10/2002 |
| WO | WO 2008/023884 A1 | 2/2008 |

OTHER PUBLICATIONS

"Author: JPO Title: Machine Translation of JP2008212852A Date: Sep. 2008" attached to U.S. Office Action dated Aug. 13, 2015 in U.S. Appl. No. 14/000,456.

"Author: JPO Title: Machine Translation of JP2004330009A Date: Nov. 2004" attached to U.S. Office Action dated Aug. 13, 2015 in U.S. Appl. No. 14/000,456.

Zuoguo Yang, "Process of Principles of Membrane Science and Technology", East China University of Science and Technology Press, p. 45.

* cited by examiner

DEVICE AND METHOD FOR TREATING BALLAST WATER FOR SHIP

TECHNICAL FIELD

The present invention relates to systems for treating ballast water stored to provide stability during voyage of ships such as oil tankers, and more particularly to a device of treating ballast water for a ship that is mounted on the ship and used to remove microbes from seawater, and a treatment method thereof.

BACKGROUND ART

Treatment of ballast water carried in ships has become an issue in recent years. Ballast water is seawater carried in a ship to provide safe voyage when the ship is empty of cargo. Ballast water is taken from the waters around a source port, and discharged to the sea during cargo loading at a destination port. Namely, the ballast water taken from the seawater at the source port is discharged at the destination port (cargo loading port). For example, when an oil tanker that departs from Japan sails to the Middle Eastern oil-producing countries such as Kuwait to be loaded with oil, the seawater from Japanese waters is carried as ballast water and discharged to the ocean in Middle Eastern waters. When the ballast water is discharged to a sea area different from the one from which it was taken, marine organisms are transported to the sea area different from their original habitat, significantly affecting the marine ecosystems.

For this reason, a variety of methods of removing, killing or inactivating microbes by purifying ballast water have been developed. For example, Japanese Patent No. 3660984 describes a method of sterilizing underwater organisms by heating seawater, and Japanese Patent No. 4261955 discloses methods using vapor and ultraviolet irradiation. Other methods such as an electrical method using voltage application or shock wave, and a method of injecting an agent such as soda hypochlorite have been proposed. Methods using filtration prior to the killing process, or for the purpose of removing relatively large microbes have also been developed.

For example, Japanese Patent Laying-Open No. 2006-728 describes a method of producing ballast water using a filtration film.

CITATION LIST

Patent Literature

PTL 1: Japanese Patent No. 3660984
PTL 2: Japanese Patent No. 4261955
PTL 3: Japanese Patent Laying-Open No. 2006-728

SUMMARY OF INVENTION

Technical Problem

The conventional treatments of ballast water have their own disadvantages.

For example, the method by heating faces the problem of securing energy for the heating, and has difficulty in completely killing microbes. The method using electrical means also has difficulty in completely killing microbes, and requires a large amount of power. The method using an agent requires a high concentration of agent, and faces such problems as neutralizing the discharged water. The method using an ultraviolet lamp is used relatively effectively, yet requires numerous lamps to completely kill microbes, and faces the challenge of installation costs. The method using a filtration film, which needs a film of extremely small pore size, requires time for filtration and needs cleaning to remove clogging, is impractical for treatment of large amounts of seawater.

While these various methods of treating ballast water have been developed, there is currently no definitive method, and further performance improvement is desired. An object of the present invention is to provide a device of treating ballast water for a ship that can be mounted on the ship and can efficiently kill or inactivate turbid materials and microbes in ballast water discharged from or loaded into the ship, and a treatment method thereof.

Solution to Problem

As a result of detailed studies of means that can be installed on a ship and can efficiently purity ballast water, the present inventors arrived at the present invention.

One invention of the present application is a device of treating ballast water for a ship, including a filter disposed as a cylinder around an axis line, and provided to be rotatable around the axis line, a treated water nozzle for emitting treated water toward an outer circumferential surface of the filter, a case provided to surround the filter, and including an outer cylindrical portion having a nozzle opening of the treated water nozzle therein, a filtered water flow path for guiding filtered water that has been transmitted through the filter to outside of the case from within the cylinder of the filter, and a discharge flow path for discharging discharged water that was not filtered through the filter to the outside of the case.

With this structure, the treated water is ejected from outside of the filter disposed as a cylinder toward the outer circumferential surface of the filter, so that the treated water continuously moves over the surface of the rotating filter while filtration takes place. Thus, the filtration can be continuously performed while clogging of the filter is removed, thereby efficiently removing foreign matters as compared to a plate-like filter having the same film area. Since turbid components adhere to and accumulate on the outer circumferential surface of the filter due to the filtration, the surface needs to be cleaned. In the filter of the present invention, which rotates while the treated water is ejected to the outer circumferential surface of the filter so that the filtration and cleaning simultaneously take place due to the effects of ejection and rotation, clogging is less likely to occur than a conventional filter. Although the treated water is preferably ejected in a direction perpendicular to the filter surface to increase the filtration pressure, when ejected in a direction away from the perpendicular direction, a driving force for rotation can be obtained.

The seawater to be treated in the present invention is not particularly limited. The seawater in a port area where ships are generally anchored contains microbes and turbid materials having a turbidity of about 1 to 100 degrees. Examples of the microbes in the seawater that pose a problem include *Escherichia coli*, *cholera vibrio*, *Enterococcus*, larvae of water flea, asterid, laminaria in Asia and the like, and most of these microbes have a size of 0.3 to several μm. A filter is used to remove the turbid materials and microbes from the seawater. A relatively tough filter made of nonwoven fabric or polyester can be used. The turbid materials to be removed contain inorganic components such as silica, of varying sizes. It is required to remove microbes and turbid materials of at least 10 μm in ballast water. A material for the filter is not particularly limited as long as they can be effectively removed. A film having a large thickness causes a corresponding reduction in flow rate of filtration, and a film having a small thickness is readily broken. Although depending on the material, the film preferably has a thickness of not less than 0.1 mm and not more than 1 mm.

Preferably, the nozzle opening of the treated water nozzle is a long opening with a direction of the axis line of the filter as a long side direction. This allows emission of the treated water across the direction of the axis line of the filter. Thus, the entire filter can be effectively utilized and efficiently cleaned. Thus, preferably, a long side length of the long opening is substantially equal to a length of the direction of the axis line of the filter. This is for effective action on the entire surface of the filter. Accordingly, the lengths do not need to be precisely equal to each other, but are only required to be configured such that the emitted treated water will reach the entire surface of the filter. The long opening as used herein means a long and thin opening having a long side and a short side. This is typically a rectangular opening in a substantially oblong shape, and also includes a shape of a track having a minor axis forming an arc, an oval shape and the like.

In addition, a direction changing plate provided to extend from an inner wall of the outer cylindrical portion in a direction of the axis line of the cylinder may be provided. Such direction changing plate blocks the treated water flowing in a circumferential direction along the filter surface around the filter within the outer cylindrical portion, and changes the flow from the circumferential direction to a direction substantially perpendicular to the cylindrical surface of the filter (radial direction of the cylinder). The water flow in the changed direction substantially perpendicular to the cylindrical surface that applies pressure to the filter surface acts to remove the turbid materials and the like adhered to the filter surface, thereby suppressing the clogging of the filter more effectively. It is effective to have a long opening, particularly a rectangular opening, as the nozzle opening because such nozzle itself has the function of the direction changing plate.

Further, a cleaning water nozzle for emitting the cleaning water toward the outer circumferential surface of the filter may be provided, with a nozzle opening of the cleaning water nozzle being provided in the outer cylindrical portion. Preferably, the cleaning water nozzle also has a long opening. By providing a nozzle dedicated to the cleaning water different from the treated water, the conditions such as the angles and the number of the nozzles can be optimized. Moreover, filtration efficiency is improved since the cleaning and filtration simultaneously take place more effectively.

In this device, discharged water that was not filtered through the filter is continuously discharged to the outside via the discharge flow path. In a common filtration device, even if the supply of treated water and the discharge of treated filtered water are continuously performed, the treated water that was not filtered is not continuously discharged. Instead, the filter is removed after operation for a certain period of time to perform maintenance such as removal of clogging. In the device of the present invention that needs to continuously treat a large amount of ballast water, the discharge can also be performed continuously to improve treatment efficiency.

Preferably, the filter is a pleated filter having a pleated shape folded in a radial direction of the cylinder.

The pleated shape refers to a shape with alternating peaks and valleys by numerously folding the surface of a filter arranged as a cylinder. The pleated shape can effectively increase a film area, and is particularly preferable for reducing an installation space of the entire device used on a ship where the installation site is significantly limited. It is preferable for the pleated shape to have a great pleat depth and a great number of pleats to increase the area. However, in consideration of the degree of clogging and the easiness of cleaning, a cylindrical filter having a diameter of about 100 to 800 mm preferably has a pleat depth of not less than 30 mm and not more than 150 mm, more preferably not less than 50 mm, and has not less than 100 and not more than 500 pleats. Although it is preferable to have a great pleat depth and a great number of pleats to increase the area, deep pleats are difficult to clean and thus are not preferable.

When the filter has a pleated shape and the nozzle opening is a long opening, preferably, a short side length of the opening is less than three times of a space between pleats of the pleated filter. The space between pleats refers to the length of a space between adjacent apices of the peaks extending outward of the cylinder, which is an average value of the spaces between the apices. That is, when the pleats are made at equal spaces, the space between pleats is a value obtained by dividing a circumferential length of the peaks by the number of peaks. It was confirmed that a sufficient cleaning effect of the filter by the water flow was not obtained when the width of the opening of the nozzle is three times the space between pleats. The short side length of the opening is preferably equal to or more than one-half of the space between pleats. This is because, if the length is reduced to be less than one-half, a supply pressure of the treated water relatively increases, or an amount of supplied water decreases under the same pressure, resulting in disadvantages such as the need to use a large pump, increased power consumption and the like. More preferably, the short side length of the opening is equal to or larger than the space between pleats rather than being less than the space between pleats, for a higher cleaning effect of the filter. It is particularly effective to have a long opening.

In addition, the filter may be configured to rotate by a pressure of the treated water emitted from the treated water nozzle. An electric motor for rotation may be further provided.

By providing the nozzle opening of the treated water nozzle at an angle so as not to mach the radial direction of the filter cylinder and ejecting the treated water to the filter surface, the filter can be rotated. The treated water can be continuously supplied to the surface without separately providing a motive power mechanism for rotating the filter. In this case, the filter surface is preferably provided with projections and recesses as a structure for readily receiving water pressure, and a filter having a pleated shape can be particularly preferably used. When the electric motor for rotation is provided, on the other hand, although a mechanism for rotation is required, stronger rotation can be freely provided to improve the filtration efficiency. It is further effective to use them in combination.

Preferably, the number of rotations is not less than 20 rpm and not more than 150 rpm to secure a treated flow rate. If the number of rotation is less than 20 rpm, it is difficult to obtain a throughput of 5 ton/H. If the number of rotation is more than 150 rpm, the treated water needs to be applied under an excessively high pressure in order to filtrate the water against the effect of a centrifugal force of rotation. In order to obtain a throughput of 20 ton/H, for example, the number of rotation is more preferably not less than 30 rpm and not more than 80 rpm.

The above structure may include a return flow path forming a flow path for returning some of the discharged water that was not filtered to a position where the water can be utilized as the treated water. The utilization itself of the discharged water as the treated water is a technique called cross flow. By applying this technique to the device of the present invention, the overall treatment efficiency can be improved.

Another invention of the present application is a device of treating ballast water for a ship, including, in addition to the above features, an ultraviolet lamp in a position of the filtered water flow path for irradiating the filtered water with ultraviolet light. It is particularly preferable to include the ultraviolet lamp in the case.

The treatment device of the present invention does not aim to remove all microbes in the treated water by filtration through the filter. Thus, the treated water that has been filtered contains microbes. It is preferable to separately provide means for killing the microbes, which can be implemented by applying known approaches. Yet a device installation space on a ship is limited, and the device is required to have an area as small as possible. Accordingly, the present invention preferably also employs ultraviolet irradiation as the means for killing microbes. Furthermore, it is particularly preferable, as a device installed on a ship, to integrate the ultraviolet lamp for ultraviolet irradiation with the filtration device and provide the lamp in the case to minimize the installation space.

The ultraviolet lamp to be used can be implemented by a lamp conventionally used for sterilization. In conventional ballast water treatment, a lamp of a straight pipe type is mainly used, and fixed such that treated water and the lamp cross a cylindrical chamber directly connected to a treated water flow path. Although the conventional embodiment of a chamber is applicable to the present invention, the chamber preferably has a prism shape in a longitudinal direction of the pipe. With such shape, the ends of the ultraviolet lamp can also be arranged in the flow of the treated water, thereby increasing use efficiency of ultraviolet light. This shape is also preferable because the flow does not become stagnant at the bottom of the chamber as the chamber does not cross the pipe, thereby eliminating the problem of deposition of a solid material.

Yet another invention of the present application is a device of treating ballast water for a ship, including a plurality of filtration process units each including a filter disposed as a cylinder around an axis line, and provided to be rotatable around the axis line, and a treated water nozzle for emitting treated water toward an outer circumferential surface of the filter, in which the plurality of filtration process units are vertically arranged coaxially around the axis line, and a common filtered water flow path is provided for guiding filtered water out of the filter in each of the filtration process units.

As described above, a device installed on a ship is significantly limited in terms of installation space, and is generally required to have a minimum installation space with respect to water treatment equipment placed on the ground. The vertical arrangement of the present invention dramatically improves the throughput per installation space. In view of the easiness of the pipe structure, by vertically arranging the filtration process units in two stages and providing the filtered water flow path from both units on a common axis line, a throughput twice as high as a conventional one per the same installation space can be obtained. In addition, the components described above that are preferably applied to the structure of the filtration process device are preferably applied to the plurality of filtration process units, respectively.

Preferably, the filtered water flow path includes an ultraviolet lamp for irradiating the filtered water with ultraviolet light. More preferably, a common rotation axis for the filters in the plurality of filtration process units, and an electric motor for rotating the rotation axis are provided. Microbes need to be killed when the structure has a plurality of stages, too, and the ultraviolet lamp can be provided in a manner similar to the case where the structure has one stage. Although the filter can be rotated by ejecting the treated water without using a motive power mechanism, energy efficiency for the rotation and installation efficiency can be improved by placing the electric motor on the common axis in the structure having the plurality of stages, with a higher effect being provided by placing the electric motor than the case where the structure has one stage.

The filtration process device including the electric motor may include a turbidity detection unit for detecting turbidity of the treated water, and may be configured to vary the number of rotations of the electric motor depending on an output from the turbidity detection unit.

One advantage of using the electric motor is that the number of rotations can be varied. This advantage can be effectively utilized by combining the use of the electric motor with the detection of turbidity of the treated water. When the turbidity of the treated water increases, the number of rotations can be increased to enhance the filtration effect, and vice versa.

The device may include a filtered water flow rate detection unit for detecting a flow rate of the filtered water, and may be configured to vary the number of rotations of the electric motor depending on an output from the filtered water flow rate detection unit.

By combining the use of the electric motor with the detection of the amount of filtered water, when the amount of filtered water decreases (namely, the filtered amount deceases due to clogging of the filter), the number of rotations can be increased to enhance the cleaning effect, thereby reducing the clogging.

The device may include a filtered water pressure detection unit for detecting a pressure of the filtered water, and may be configured to vary the number of rotations of the electric motor depending on an output from the filtered water pressure detection unit.

The pressure of the filtered water to be detected may be absolute pressure, and may be detected from differential pressure between the treated water introduction pressure and the filtered water pressure. In any case, when the filtered water pressure decreases (namely, the filtered amount deceases due to clogging of the filter), the number of rotations can be increased to enhance the cleaning effect, thereby reducing the clogging. These detections and the control of the number of rotations can be used alone or in combination.

The present invention further provides a treatment method of treating ballast water for a ship by using the above device.

Advantageous Effects of Invention

According to the invention described above, a device of treating ballast water for a ship that can be mounted on the ship and can efficiently kill or inactivate turbid materials and microbes in ballast water discharged from or loaded into the ship can be provided.

DESCRIPTION OF EMBODIMENTS

A structure of a device of treating ballast water for a ship according to the present invention will be described with reference to the drawings. It should be noted that the present invention is not limited to the embodiments disclosed herein, but is defined by the terms of the claims, and is intended to include any modifications within the scope and meaning equivalent to the terms of the claims.

Figure 1A:
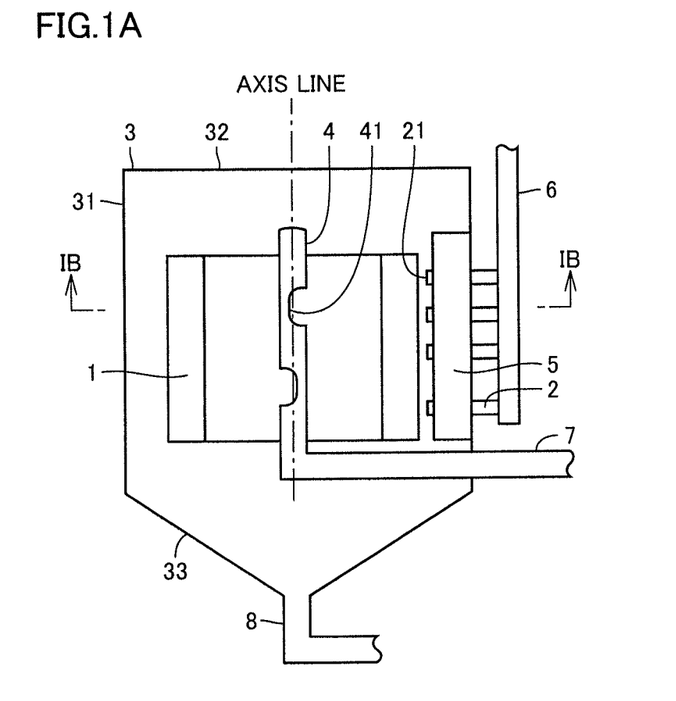
FIG. 1A shows an example of a device of treating ballast water for a ship according to the present invention, schematically illustrating a structure in vertical cross section including an axis line.
Figure 1B:
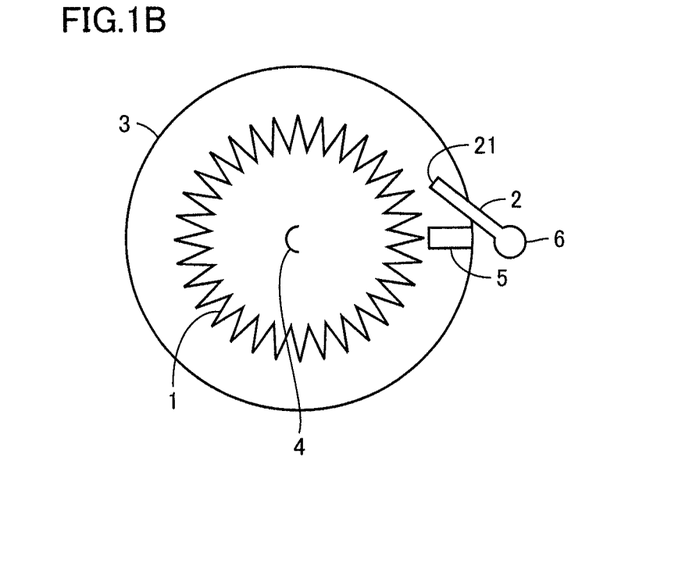
FIG. 1B shows the example of the device of treating ballast water for a ship according to the present invention, schematically illustrating a structure in horizontal cross section along a line IB-IB shown in FIG. 1A.

FIGS. 1A and 1B show an example of a device of treating ballast water for a ship according to the present invention. FIG. 1A schematically illustrates the structure in vertical cross section including an axis line, and FIG. 1B schematically illustrates the structure in horizontal cross section along a line IB-IB shown in FIG. 1A. A cylindrical filter 1 is disposed around the axis line which is the center of rotation, and is mounted to be rotatable around a central pipe arranged in the center (the pipe does not rotate). FIGS. 1A and 1B show a pleated filter as filter 1, which is folded to have alternating peaks and valleys in a radial direction of the cylinder. Upper and lower surfaces of filter 1 are sealed in a watertight manner. The rotatable mounting needs to have a similar watertight structure, and employs a known structure without particularly being limited. A case 3 is provided to cover the entire filter 1. Case 3 includes an outer cylindrical portion 31, a lid portion 32, and a bottom portion 33, with a discharge flow path 8 being provided on bottom portion 33. A treated water flow path 6 and treated water nozzles 2 are provided for introducing seawater as treated water into case 3. Each of treated water nozzles 2 is provided to extend from treated water flow path 6 to have a nozzle opening 21 in outer cylindrical portion 31 of case 3, and is configured to emit the treated water toward an outer circumferential surface of filter 1.

In this example, the treated water ejected from treated water nozzles 2 strikes the pleated outer circumferential surface of pleated filter 1, causing pleated filter 1 to rotate by this pressure. Some of the treated water is directly filtered through filter 1 and the filtered water is transmitted through the cylinder of filter 1, while the remaining water flows within case 3 in a direction of rotation of filter 1. The flow of the treated water that has circled once within case 3 is blocked by a direction changing plate 5 provided near nozzles 2, and is changed in flow direction to generate pressure in a filter direction. As a result, a water flow is applied to the filter surface under constant pressure substantially perpendicular to the surface, thereby providing a cleaning effect of filter 1 by this force. The filter surface is also cleaned by the water flow from treated water nozzles 2 while the filtration takes place. However, a high cleaning effect is obtained in the vicinity of nozzles 21, while a portion far from nozzles 2 is less likely to be struck by the water flow. By providing direction changing plate 5, the entire flow that has circled around in a circumferential direction strikes the filter surface to enhance the cleaning effect of the entire filter 1, thereby further improving filtration efficiency of the entire treatment device. Although case 3 is illustrated to have a large space to facilitate understanding of the structure within case 3, in reality, unwanted space is naturally minimized. The treated water that was not filtered and turbid materials deposited in case 3 are successively discharged via discharge flow path 8 at the bottom of case 3. Such continuous discharge of the turbid materials and the remaining treated water while the filtration takes place is also a characteristic of this device, which is effective in securing a required throughput of at least 10 to 20 ton/H of ballast water. Although discharge flow path 8 is not provided with a valve or the like in the drawings, equipment necessary for maintenance or flow rate adjustment may be provided. On the other hand, the filtered water through filter 1 is guided through intake holes 41 formed in central pipe 4 within filter 1 to a filtered water flow path 7, and emitted to the outside of case 3.

Figure 2:
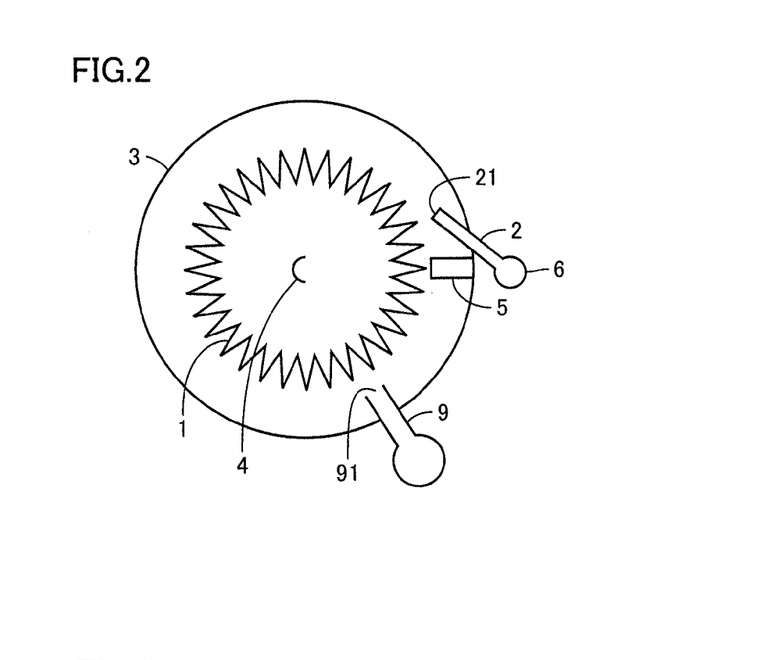
FIG. 2 shows another example of the device of treating ballast water for a ship according to the present invention.

During the above operation, the turbid materials adhere to the outer circumferential surface of filter 1. Filter 1 thus needs to be exchanged or cleaned for long-term operation. In the structure of the present invention, a water flow is continuously produced onto the outer circumferential surface of filter 1 due to the pressure of the treated water ejected from treated water nozzles 2 and the water flow from the rotation, which facilitates removal of the adhered turbid materials. That is, a constant cleaning effect is also provided. It will be more effective to separately provide a cleaning nozzle. FIG. 2 explains an example of such structure, illustrating the structure in cross section similar to that in FIG. 1B. Aside from treated water nozzles 2, a cleaning nozzle 9 is provided through the outer cylindrical portion of case 3, with a nozzle opening 91 being directed to the filter surface. It is preferable that cleaning nozzle 9 vigorously eject cleaning water different from the treated water, namely, water with a minimal amount of turbid material, to the outer circumferential surface of filter 1, perpendicularly to filter 1 (radial direction of the filter cylinder). It will be effective to rotate filter 1 by the cleaning water as well, in which case nozzle opening 91 may be inclined.

Figure 3:
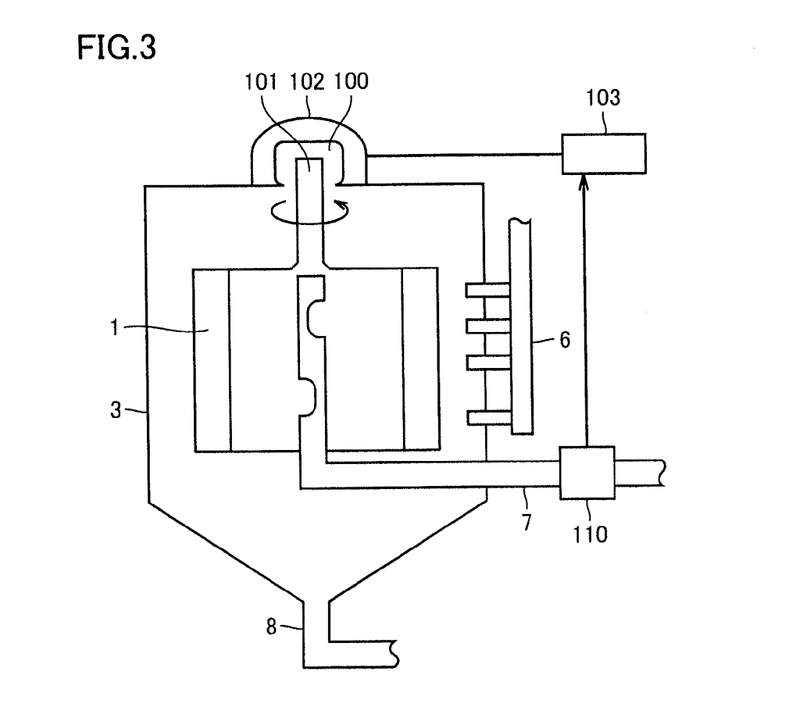
FIG. 3 shows another example of the device of treating ballast water for a ship according to the present invention, illustrating a structure including an electric motor.

FIG. 3 shows another example of the device of treating ballast water for a ship according to the present invention, illustrating a structure including an electric motor. In FIGS. 1A and 1B, filter 1 is rotated by the water flow of the treated water. In the structure of FIG. 3, an axis 101 of an electric motor 100 is connected to a central axis of the filter to forcibly rotate the filter. This structure is advantageous in that the rotational speed can be freely set and changed, although another energy for driving is required as compared to the rotation by the water flow. Electric motor 100 is housed by being covered with a motor cover 102, and is driven with electric power from a driving control unit 103.

Figure 12:
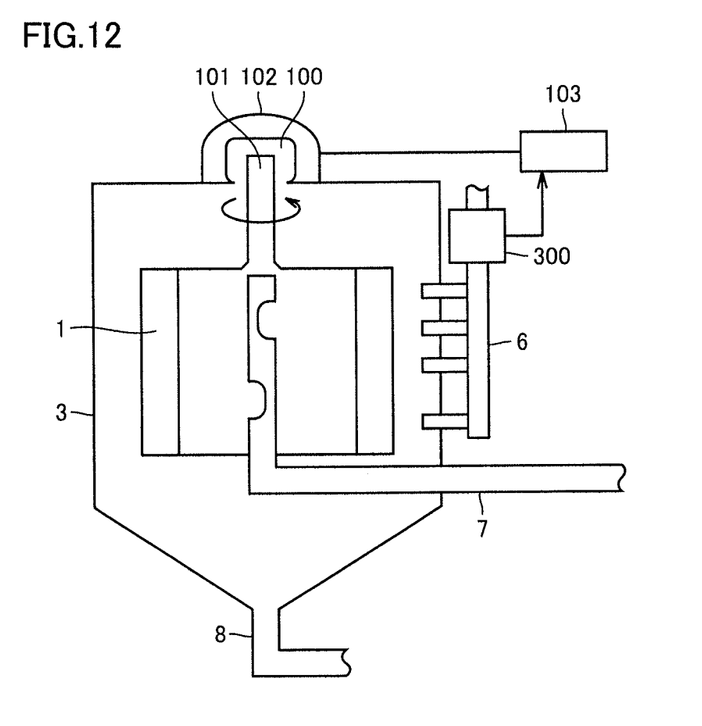
FIG. 12 illustrates a structure including a turbidity detection unit.

The number of rotations of electric motor 100 may be constant or artificially and freely determined, and is more preferably controlled depending on the state of filtration. In the structure of FIG. 3, a filtered water detection unit 110 for detecting a state of filtered water is provided on filtered water flow path 7 for filtered water, and the detected information is transmitted to driving control unit 103. Driving control unit 103 performs control such that the number of rotations is varied in response to the information from filtered water detection unit 110. Specifically, filtered water detection unit 110 may be a filtered water flow rate detection unit, or a filtered water pressure detection unit. Alternatively, as shown in FIG. 12, a turbidity detection unit 300 for detecting turbidity of the treated water rather than the filtered water may be provided on treated water flow path 6 for treated water. These units may be employed alone or in combination. Turbidity detection unit 300 detects an amount of turbid material contained in the filtered water, and may be implemented by a translucent turbidity sensor or the like. The filtered water flow rate detection unit may be implemented by a known flowmeter. The filtered water pressure detection unit may be implemented by a known pressure sensor. In any case, a detected state or numerical value is preferably output as an electric signal. The electric signal is input to driving control unit 103 of electric motor 100 for automatic control.

When turbidity detection unit 300 is used and if the turbidity is high, the number of rotations of filter 1 can be increased to increase a filtered amount. When the filtered water flow rate detection unit is used and if a flow rate decreases (namely, the filtered amount deceases due to clogging of filter 1), the number of rotations can be increased to enhance the cleaning effect and reduce the clogging. When the filtered water pressure detection unit is used and if the pressure of the filtered water decreases (namely, the filtered amount deceases due to clogging of filter 1), the number of rotations can be increased to enhance the cleaning effect and reduce the clogging.

Figure 4:
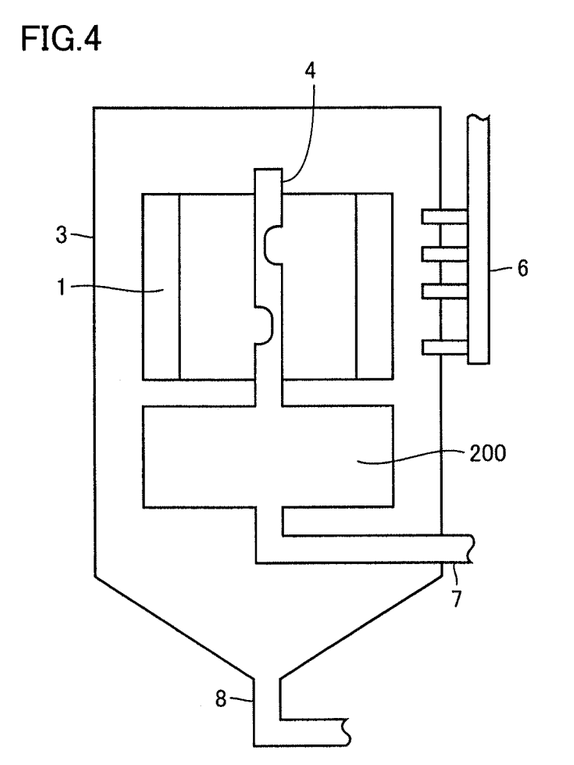
FIG. 4 shows another example of the device of treating ballast water for a ship according to the present invention, illustrating a structure including an ultraviolet irradiation unit therein.

FIG. 4 illustrates the structure of the above treatment device including an ultraviolet irradiation unit. An ultraviolet irradiation unit 200 is provided within case 3, and the filtered water collected by central pipe 4 is irradiated with ultraviolet light by ultraviolet lamps and discharged to filtered water flow path 7. Conventionally, equipment for killing underwater microbes has been provided separately from filtration equipment, on extension of the filtered water flow path, often causing difficulty in securing installation floor space on a ship. According to the structure of the present invention, the killing of microbes with the ultraviolet lamps and the filtration can be simultaneously performed without an increase in installation floor space.

Figure 5A:
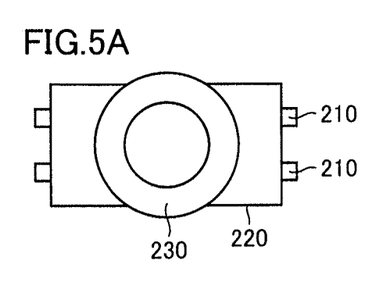
FIG. 5A is a top view showing a structural example of the ultraviolet irradiation unit.
Figure 5B:
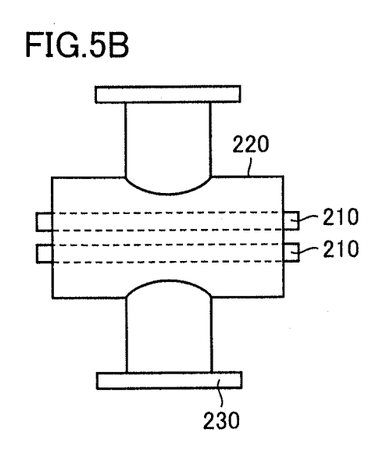
FIG. 5B is a front view showing the structural example of the ultraviolet irradiation unit.
Figure 5C:
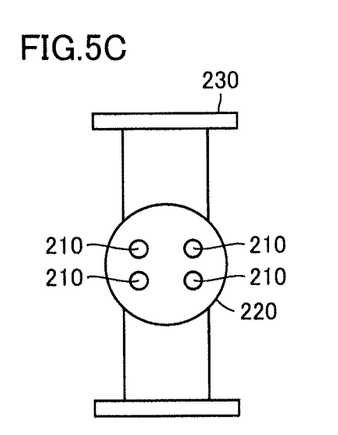
FIG. 5C is a side view showing the structural example of the ultraviolet irradiation unit.

FIGS. 5A, 5B and 5C show the structure of the ultraviolet irradiation unit. FIG. 5A is a top view, FIG. 5B is a front view, and FIG. 5C is a side view. The ultraviolet irradiation unit shown in FIGS. 5A to 5C has a structure similar to that of a conventional ultraviolet irradiation unit used separately from a filtration unit. Flanges 230 are for connection with upper and lower pipes thereof. A pipe portion sandwiched between upper and lower flanges 230 is provided with an ultraviolet irradiation chamber 220 of a horizontal cylindrical type, which includes a plurality of ultraviolet lamps 210 therein. While such structure is relatively readily manufactured, portions near opposing ends of ultraviolet lamps 210 are located in a portion where the filtered water does not flow, resulting in lowered use efficiency of ultraviolet light.

Figure 6A:
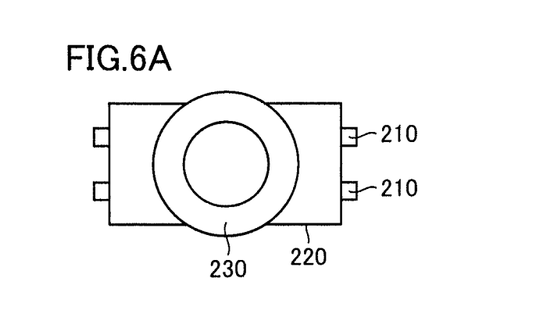
FIG. 6A is a top view showing another structural example of the ultraviolet irradiation unit.
Figure 6B:
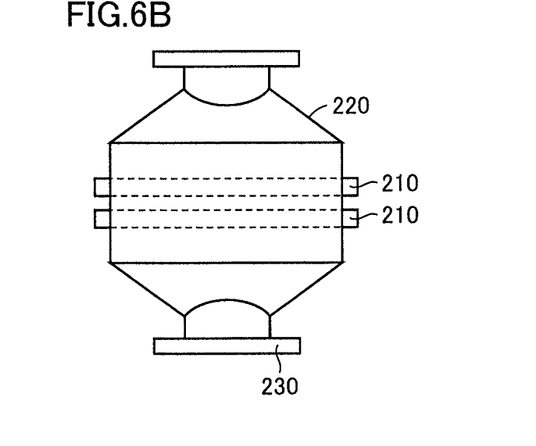
FIG. 6B is a front view showing the another structural example of the ultraviolet irradiation unit.
Figure 6C:
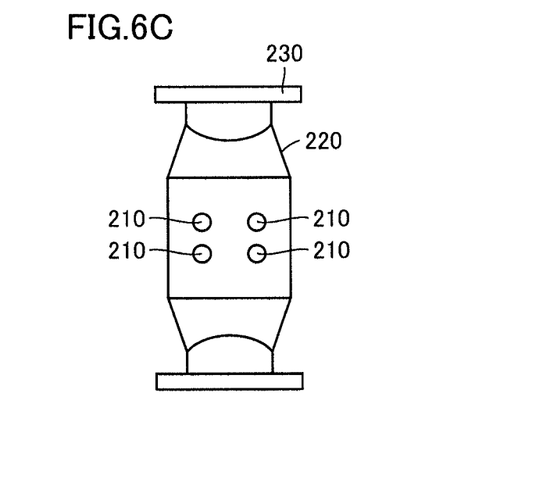
FIG. 6C is a side view showing the another structural example of the ultraviolet irradiation unit.

FIGS. 6A, 6B and 6C show an improved structure of the ultraviolet irradiation unit. In the structure shown in FIGS. 6A to 6C, as in FIGS. 5A to 5C, ultraviolet irradiation chamber 220 is provided on the pipe with flanges 230 as pipe connection units, and chamber 220 has a characteristic structure. At least two opposite surfaces of chamber 220 are planes, where the ends of ultraviolet lamps 210 are provided. Further, chamber 220 has a tapered shape whose diameter is increased from the pipe toward a portion of chamber 220 on which the ultraviolet lamps are mounted. In FIGS. 6A to 6C, the portion on which the ultraviolet lamps are mounted is a prism, and is connected to the pipe with the tapered portion interposed therebetween. With this structure, incoming water from above the pipe flows downward while spreading across chamber 220, generating a steady flow to the ends of ultraviolet lamps 210. Thus, the ultraviolet light can be effectively utilized. In addition, since the portion on which the ultraviolet lamps are mounted is connected to the pipe with the tapered portion interposed therebetween in a lower portion of chamber 220 as well, turbid materials and the like will not be deposited in the lower portion of chamber 220, thereby making maintenance easy. Such new structure of ultraviolet irradiation chamber 220 can be used when integrated with the treatment device and housed in case 3 as the structure of the present invention, and can also be used as an ultraviolet irradiation unit for ballast water separately and individually used as in conventional techniques.

Figure 7:
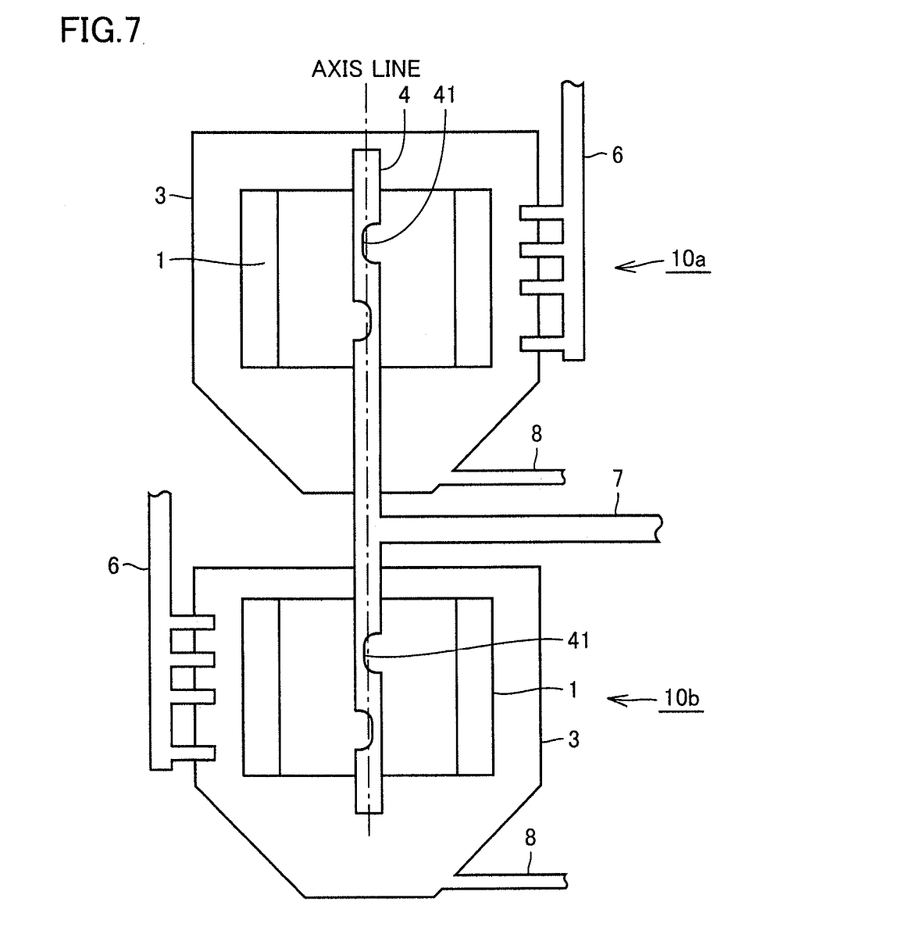
FIG. 7 shows another example of the device of treating ballast water for a ship according to the present invention, illustrating a structure including a plurality of filtration process units.

Another structural example of the present invention will be described with reference to FIG. 7. FIG. 7 illustrates a structure where portions each including case 3, filter 1 and the like of the treatment device described with reference to FIGS. 1A, 1B and the like (referred to as filtration process units) are vertically arranged in two stages and connected to each other. An upper filtration process unit 10a and a lower filtration process unit 10b are arranged one above the other, with common central pipe 4. For illustrative purposes, the structure is schematically illustrated in this figure without fixing members and the like. Filtration process units 10a and 10b can employ the various structures described above. Since they share central pipe 4, the respective filtered waters are collected through respective intake holes 41 into central pipe 4, and led to the outside via filtered water flow path 7. Although treated water flow path 6 and discharge flow path 8 are provided for each unit in this example, they may be shared by both units. In addition, although the pipe can be efficiently arranged by sharing filtered water flow path 7, path 7 does not need to be shared and various embodiments can be employed.

Figure 13:
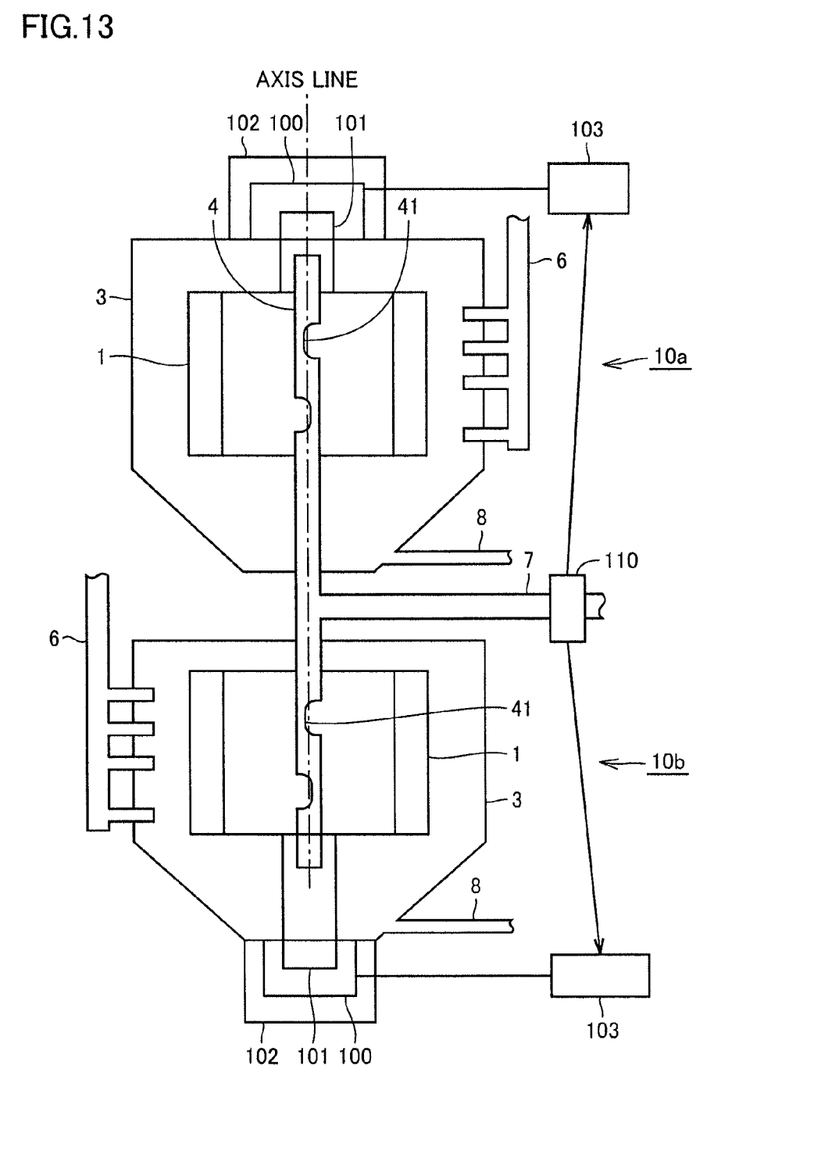
FIG. 13 illustrates a structure including an electric motor for each of the filtration process units, and including a common filtered water detection unit for the filtration process units.

Alternatively, as shown in FIG. 13, each of filtration process units 10a and 10b may include electric motor 100. In this case, in the same manner as above, axis 101 of each electric motor 100 is connected to the central axis of filter 1. Each electric motor 100 is housed by being covered with motor cover 102, and is driven with electric power from driving control unit 103. The number of rotations of each electric motor 100 is preferably controlled depending on the filtration state. In this case, filtered water detection unit 110 for detecting a state of filtered water is provided on filtered water flow path 7, and the information detected by filtered water detection unit 110 is transmitted to driving control unit 103.

Figure 14:
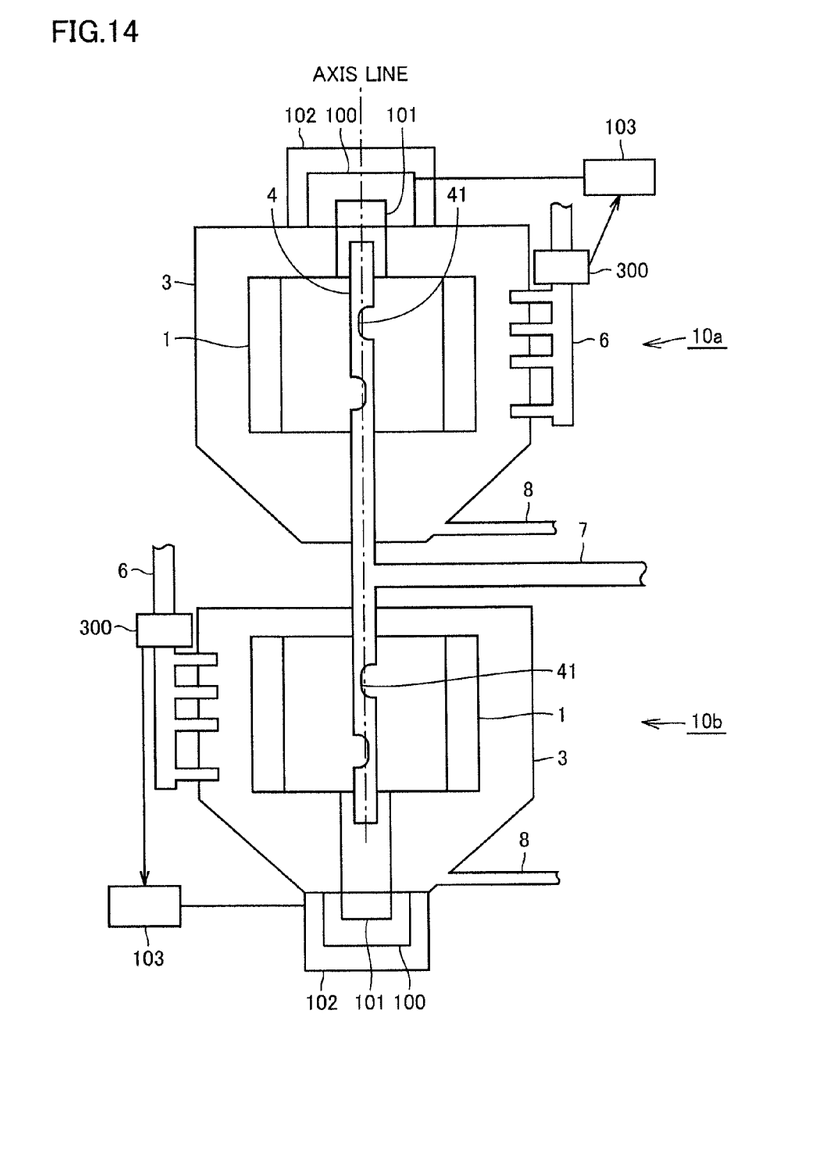
FIG. 14 illustrates a structure including an electric motor and a turbidity detection unit for each of the filtration process units.

Alternatively, as shown in FIG. 14, turbidity detection unit 300 for detecting turbidity of the treated water rather than the filtered water may be provided on treated water flow path 6 of each of filtration process unit 10a and 10b. Information about the turbidity of the treated water detected by turbidity detection unit 300 can be input to driving control unit 103, to control the number of rotations of electric motor 100 depending on the state of turbidity of the treated water.

Figure 8:
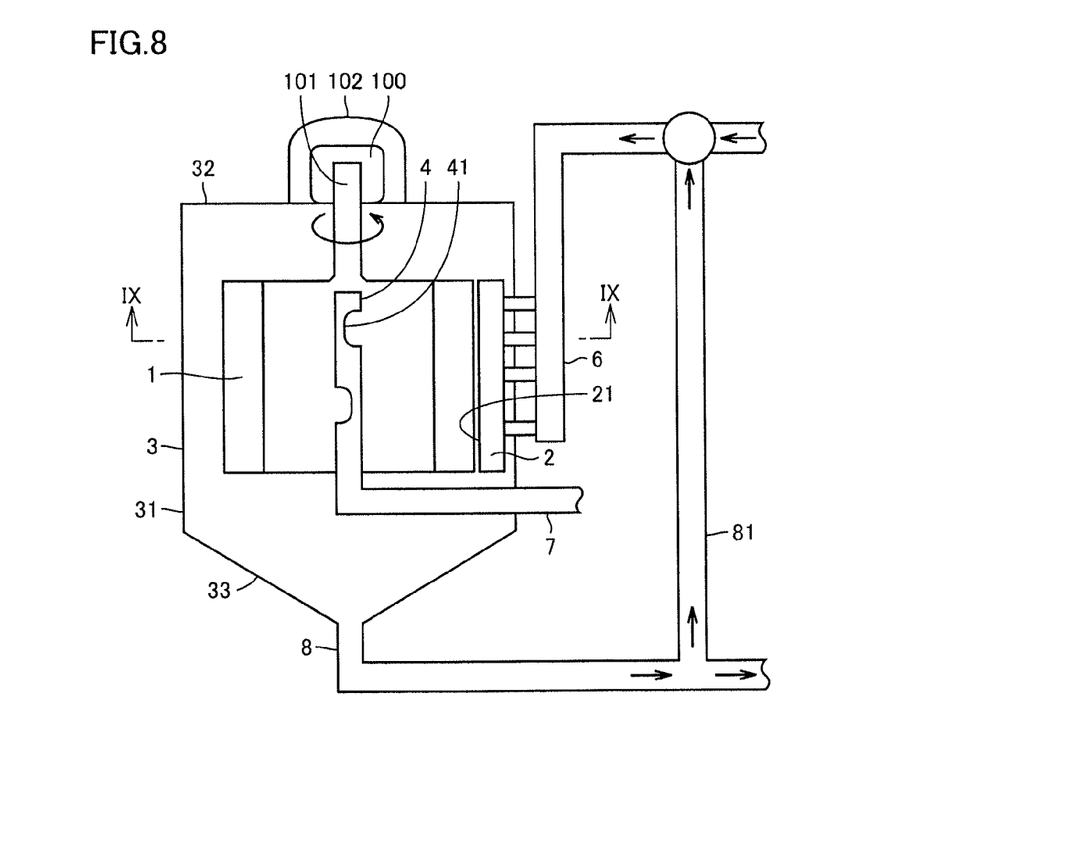
FIG. 8 shows a structural example of the device of treating ballast water for a ship according to the present invention in which a nozzle opening is a long opening, schematically illustrating a structure in vertical cross section including an axis line.
Figure 9:
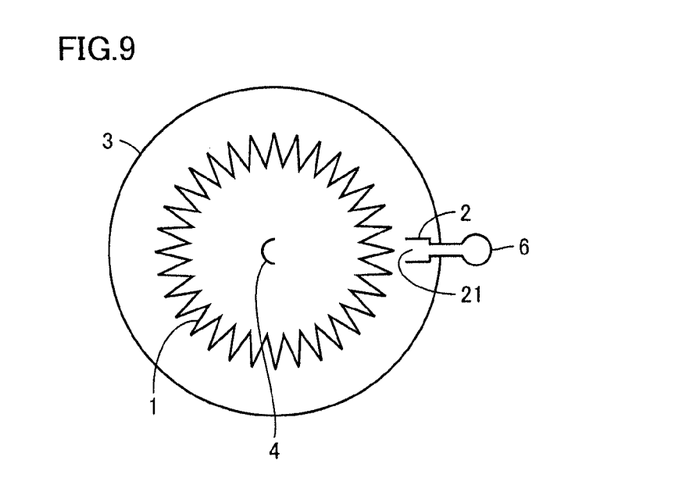
FIG. 9 schematically illustrates a structure in horizontal cross section along a line IX-IX shown in FIG. 8.

Although a structural example where the nozzle opening is a long opening will be described below with reference to numerical values in an example, the numerical values are not restrictive. FIG. 8 shows a structural example of the device of treating ballast water for a ship according to the present invention in which the nozzle opening is a long opening, schematically illustrating the structure in vertical cross section including the axis line. FIG. 9 schematically illustrates the structure in horizontal cross section along a line IX-IX shown in FIG. 8. The structure is basically similar to those shown in FIGS. 1A, 1B or FIG. 3. Cylindrical filter 1 is disposed around the axis line which is the center of rotation, and is mounted to be rotatable around central pipe 4 arranged in the center (pipe 4 does not rotate). A pleated filter folded to have alternating peaks and valleys in the radial direction of the cylinder is shown as filter 1. Pleated filter 1 had an outer diameter of 334 mm, an axial length of 200 mm, and a pleat depth of 75 mm. The upper and lower surfaces of filter 1 are sealed in a watertight manner. The rotatable mounting needs to have a similar watertight structure, and employs a known structure without particularly being limited. Case 3 is provided to cover the entire filter 1. Case 3 includes outer cylindrical portion 31, lid portion 32, and bottom portion 33, with discharge flow path 8 being provided on bottom portion 33. Outer cylindrical portion 31 had an outer diameter of 406 mmφ. Treated water flow path 6 and treated water nozzle 2 are provided for introducing seawater as treated water into case 3. Treated water nozzle 2 is provided to extend from treated water flow path 6 to have nozzle opening 21 in outer cylindrical portion 31 of case 3, and is configured to emit the treated water toward the outer circumferential surface of filter 1.

Figure 10:
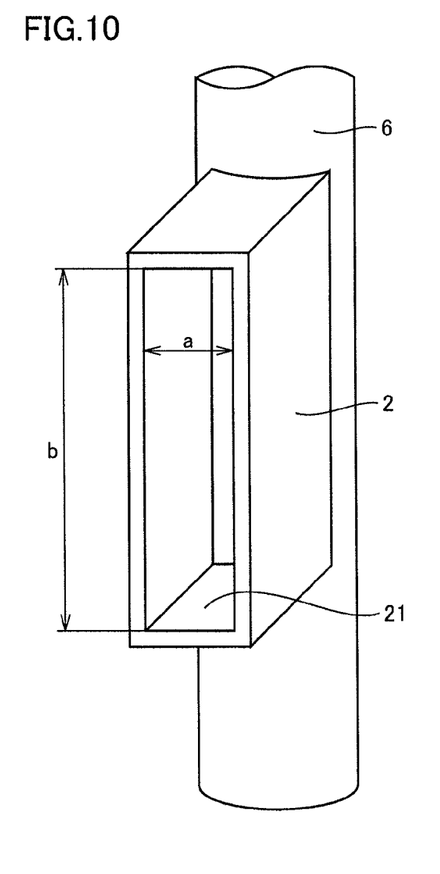
FIG. 10 shows a structural example in which the nozzle opening is a rectangular opening, as a structural example of the long opening.
Figure 11:
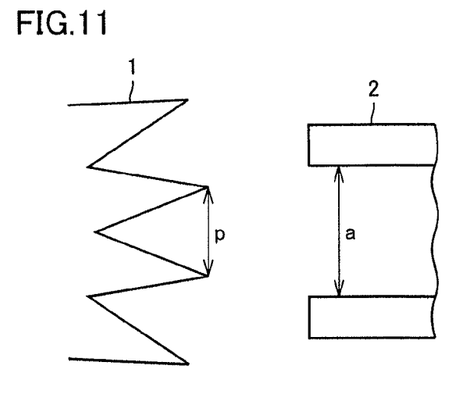
FIG. 11 explains relation between a pleated filter and the opening.

Nozzle opening 21 of treated water nozzle 2 in FIG. 8 is a rectangular opening such as shown in FIG. 10. That is, the opening has a substantially oblong shape with a short side length a and a long side length b. The opening and treated water flow path 6 may be connected to each other via a plurality of pipes as in FIG. 8, or may be directly connected as in FIG. 10, without being limited. While not particularly limited, long side length b is preferably substantially equal to (within ±10%) or longer than the axial length of pleated filter 1, in order to effectively supply the treated water to the entire pleated filter 1. These lengths are equal to each other in this example. Short side length a will be described with reference to FIG. 11. FIG. 11 schematically illustrates cutaway portions of pleated filter 1 and the opening of oppositely provided nozzle 2. Relative to the peaks and valleys of pleated filter 1, short side length a is preferably equal to or less than three times of a space p between the peaks (p<3a), more preferably equal to or less than twice the space p, and further preferably satisfies p<a, to increase the cleaning effect of pleated filter 1. In this example, the cleaning effect was examined by varying short side length a of the opening of treated water nozzle 2 for filter 1 where space p between pleats was set to 5 mm. The results showed that the cleaning was insufficient when a=15 mm, extremely effective when a=8 mm, and practically effective but less so than when a=8 mm when a=3 mm. In view of these findings, this example employed a design of a=8.3 mm, b=200 mm, and p=5 mm. If the opening is not rectangular but has rounded corners or an oval-like shape as a whole, a maximum length in the filter axial direction is defined as the long side length, and a maximum width of the opening in a direction at right angles to the long side is defined as the short side length.

In this example, axis 101 of electric motor 100 is connected to the filter central axis of pleated filter 1, to rotate the filter. Thus, the rotational speed can be freely set and changed. In this example, the number of rotations was set to 50 rpm for operation. Electric motor 100 is housed by being covered with motor cover 102, and is driven with electric power from driving control unit 103 (FIG. 3). Some of the treated water is filtered through filter 1, while the remaining water flows within case 3 in the rotation direction of filter 1. The treated water that has circled once within case 3 is blocked by the long nozzle (treated water nozzle 2) serving also as the direction changing plate described above, and is changed in flow direction to generate pressure in the filter direction. As a result, a water flow is applied to the filter surface under constant pressure substantially perpendicular to the surface, thereby providing a cleaning effect of filter 1 by this force. The filter surface is cleaned by the water flow from treated water nozzle 2 while the filtration takes place, thereby providing a high cleaning effect. Although case 3 is illustrated to have a large space to facilitate understanding of the structure within case 3, in reality, unwanted space is naturally minimized. The treated water that was not filtered and turbid materials deposited in case 3 are successively discharged via discharge flow path 8 at the bottom of case 3. Although discharge flow path 8 is not provided with a valve or the like in the drawings, equipment necessary for maintenance or flow rate adjustment may be provided. On the other hand, the filtered water through filter 1 is guided through intake holes 41 formed in central pipe 4 within filter 1 to filtered water flow path 7, and emitted to the outside of case 3.

Another feature of the structural example shown in FIG. 8 is that cross flow filtration is performed. That is, a mechanism is provided for causing the treated water that was not filtered and is discharged via discharge flow path 8 to flow through a return flow path 81 to join in treated water flow path 6. As a result, filtration efficiency of the entire treated water can be increased. It was also confirmed that there was a ratio with which the cleaning effect of filter 1 can be effectively secured while a large amount of filtered water is obtained, by appropriately setting an amount to be returned and an amount to be flown. In this example, an amount of filtered water could be secured while the cleaning effect was provided by employing a structure in which 30 ton/H (hour) of treated water was flown, 20 ton/H of filtered water was obtained, and 8 ton/H of 10 ton/H of discharged water was returned.

In this structure, too, a cleaning nozzle may be separately provided, which is effective in enhancing the cleaning capability. The cleaning nozzle may be provided in a manner similar to cleaning nozzle 9 shown in FIG. 2, and may have a long opening as the nozzle opening to obtain a higher cleaning effect. A rectangular opening similar to that of treated water nozzle 2 shown in FIGS. 8 to 11 may be used, for example.

REFERENCE SIGNS LIST

1 filter; 2 treated water nozzle; 21 nozzle opening; 3 case; 31 outer cylindrical portion; 32 lid portion; 33 bottom portion; 4 central pipe; 41 intake hole; 5 direction changing plate; 6 treated water flow path; 7 filtered water flow path; 8 discharge flow path; 81 return flow path; 9 cleaning nozzle; 91 nozzle opening; 10*a*, 10*b* filtration process unit; 100 electric motor; 101 rotation axis; 102 motor cover; 103 driving control unit; 110 filtered water detection unit; 200 ultraviolet irradiation unit; 210 ultraviolet lamp; 220 ultraviolet irradiation chamber; 230 flange; 300 turbidity detection unit.

The invention claimed is:

1. A device of treating ballast water for a ship, comprising:
a filter disposed as a cylinder around an axis line and having a length in the direction of said axis line, the filter being rotatable around said axis line;
a treated water nozzle for emitting treated water toward an outer circumferential surface of said filter, the treated water nozzle including a nozzle opening, wherein the nozzle opening of said treated water nozzle has one long opening with a long side length in the direction of said axis line and the long side length of said one long opening is substantially equal to or longer than the length of the filter in the direction of said axis line;
a case provided to surround said filter, and including an outer cylindrical portion having the nozzle opening of said treated water nozzle therein;
a filtered water flow path for guiding filtered water that has been transmitted through said filter to outside of said case from within the cylinder of said filter; and
a discharge flow path for discharging discharged water that was not filtered through said filter to the outside of said case.

2. The device of treating ballast water for a ship according to claim 1, further comprising a direction changing plate provided to extend from an inner wall of said outer cylindrical portion in a direction of the axis line of the cylinder, for changing a flow of the treated water from a circumferential direction of the cylinder to a radial direction of the cylinder.

3. The device of treating ballast water for a ship according to claim 1, wherein said filter is a pleated filter having a pleated shape folded in a radial direction of the cylinder.

4. The device of treating ballast water for a ship according to claim 3, wherein a short side length of said long opening is less than three times of a space between pleats of said pleated filter.

5. The device of treating ballast water for a ship according to claim 1, wherein said filter is configured to rotate by a pressure of the treated water emitted from said treated water nozzle.

6. The device of treating ballast water for a ship according to claim 1, further comprising an electric motor for rotating said filter.

7. The device of treating ballast water for a ship according to claim 6, further comprising a turbidity detection unit for detecting turbidity of said treated water, wherein said device is configured to vary the number of rotations of said electric motor depending on an output from said turbidity detection unit.

8. The device of treating ballast water for a ship according to claim 6, further comprising a filtered water flow rate detection unit for detecting a flow rate of said filtered water, wherein said device is configured to vary the number of rotations of said electric motor depending on an output from said filtered water flow rate detection unit.

9. The device of treating ballast water for a ship according to claim 6, further comprising a filtered water pressure detection unit for detecting a pressure of said filtered water, wherein said device is configured to vary the number of rotations of said electric motor depending on an output from said filtered water pressure detection unit.

10. The device of treating ballast water for a ship according to claim 1, wherein the number of rotations of said filter is not less than 20 rpm and not more than 150 rpm.

11. The device of treating ballast water for a ship according to claim 1, further comprising a cleaning water nozzle for emitting cleaning water toward said outer circumferential surface of said filter, wherein a nozzle opening of said cleaning water nozzle is a long opening with a direction of said axis line as a long side direction.

12. The device of treating ballast water for a ship according to claim 1, further comprising a return flow path for returning some of said discharged water to a position where the water can be utilized as the treated water.

13. The device of treating ballast water for a ship according to claim 1, further comprising an ultraviolet lamp in said case for irradiating the filtered water with ultraviolet light.

* * * * *